Figure 1:
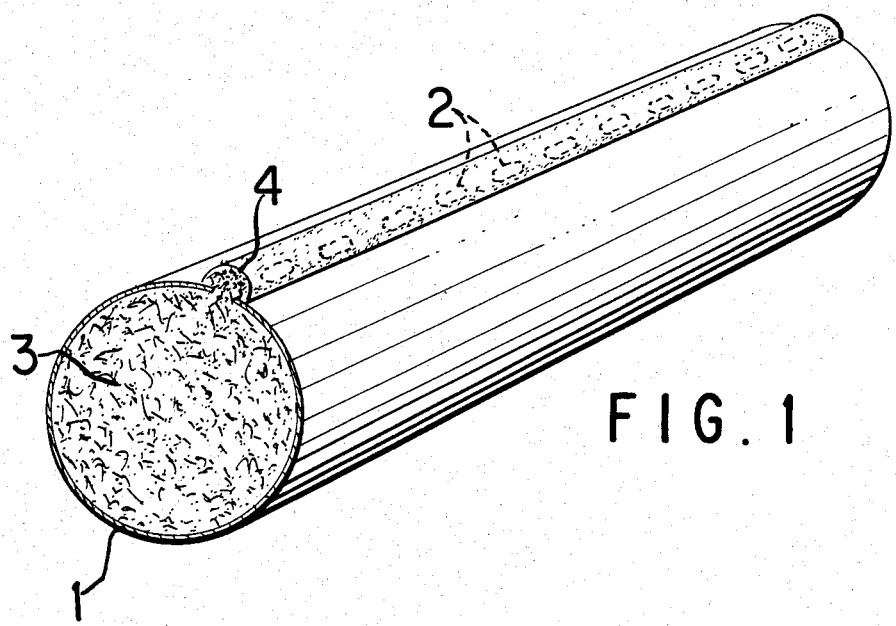

United States Patent [19]

Kretzschmann

[11] Patent Number: 4,539,011

[45] Date of Patent: Sep. 3, 1985

[54] ARTIFICIAL FIREPLACE LOG

[75] Inventor: Günther Kretzschmann, Münster-Sarmsheim, Fed. Rep. of Germany

[73] Assignee: Anasco Gesellschaft mit beschränkter Haftung, Ingelheim am Rhein, Fed. Rep. of Germany

[21] Appl. No.: 512,959

[22] Filed: Jul. 12, 1983

[30] Foreign Application Priority Data

Jul. 21, 1982 [DE] Fed. Rep. of Germany ....... 3227148
Nov. 13, 1982 [DE] Fed. Rep. of Germany ....... 3242064

[51] Int. Cl.³ .......................... C10L 5/36; C10L 11/06
[52] U.S. Cl. .......................................... 44/14; 44/38; 44/40
[58] Field of Search ................................ 44/14, 38, 40

[56] References Cited

U.S. PATENT DOCUMENTS

| | | | |
|---|---|---|---|
| 3,988,121 | 10/1976 | Leveskis | 44/38 X |
| 4,043,765 | 8/1977 | Tanner | 44/14 |
| 4,202,669 | 5/1980 | Ball | 44/38 X |
| 4,243,393 | 1/1981 | Christian | 44/14 |
| 4,243,394 | 1/1981 | Kincaid | 44/14 |

*Primary Examiner*—Carl F. Dees
*Attorney, Agent, or Firm*—Hammond & Littell, Weissenberger & Dippert

[57] ABSTRACT

An artificial fireplace log consisting of a difficultly burnable sleeve filled with an easily flammable material and having an external ignition strip of easily flammable material. The sleeve has prefabricated discontinuities acting as ignition points.

5 Claims, 2 Drawing Figures

ARTIFICIAL FIREPLACE LOG

This invention relates to a novel artificial fireplace log, as well as to a method of manufacturing the same.

BACKGROUND OF THE INVENTION

The use of real firewood for open fireplaces has a number of disadvantages. In modern city apartments, for instance, wood does not store well. Besides, the wood is often delivered while still wet and must be stacked to dry. In addition, wood is in short supply worldwide and therefore expensive.

Because of these disadvantages, firewood substitute products have been developed and offered. They are either extruded wood wastes such as wood shavings or cylindrical compacts consisting of a mixture of paraffin and sawdust. While, because of its compact constitution, the first-named product has quite inferior burning properties both with respect to ignition as well as its flame development, the last-mentioned product burns better but does not come close to real fireplace logs either in appearance or in the burning properties.

OBJECTS OF THE INVENTION

It is an object of the invention to provide a firewood substitute product which, in appearance as well as in its burning properties, comes as close as possible to firewood, is easy and cheap to manufacture, and stores well.

Other objects and advantages of the invention will become apparent as the description thereof proceeds.

THE INVENTION

The above objects are achieved by giving an enveloping body (sleeve) of difficultly burnable material the shape and color of split logs or round wood and providing it with one or more prefabricated discontinuities which function as preferential ignition or burning sites. This can be done, for example, by providing it with some or a plurality of holes of a diameter of about 10 to 20 mm, for example spaced about 30 to 80 mm apart, and distributed regularly or at random over the entire sleeve surface, and filling the sleeve with the actual fuel material, for instance by pouring or pressing it in.

Another possibility is to provide the sleeve surrounding the burnable filling on its exterior with one or more kindling strips or ridges extending lengthwise. Thus, one can provide the sleeve with one or more rows of holes, and then filling it with a polymerizable liquid fuel material comprising a hardener substance for later solidification. A slight excess of fuel material is employed, so that the liquid wells over from the holes and is shaped during hardening as a strip covering the respective row of successive holes.

According to another embodiment of the invention, the difficultly burnable sleeve is provided not with holes, but with a lengthwise slit (gap), so that when filling in the burnable substance, the excess wells out of the slit and is shaped during the solidification process as a strip or longitudinal bead covering the slit.

The difficultly flammable sleeve may be made, for instance, of paperboard, glassfiber fabric, cardboard, kraft paper, difficultly flammable plastic and/or hard-to-burn laminates, providing optionally also an intermediate layer of aluminum to further reduce the burnability of the sleeve.

Suitable fillings have proved to be the usual coal lighter emulsions containing a hardener (so-called "white coal lighters", see German Pat. No. 1,504,012). Such emulsions may optionally be enriched with wood dust, sawdust or the like. In addition, mixtures of wood waste, such as chips, flour or shavings, and paraffins or waxes in a ratio of about 2:1 to 1:2, and/or mixtures of wood waste, preferably wood flour and waste paraffins or by-products from stearic acid manufacture (distillation residues) have proved to be usable.

The shape of the sleeve may be cylindrical, as shown in the accompanying drawings, or else rectangular, prismatic or irregular, for instance to imitate a natural log.

The firewood substitute products of the present invention have, in principle, the advantage of multifarious configurations, from the usual roll (cylindrical) form to triangular forms resembling split logs to gnarled branch forms blown or pressed from difficultly burnable synthetic materials. They may therefore be regarded not only as a substitute, but even as a perfect imitation of firewood, the more so because the controlled combustion decelerated by the sleeve material produces a flame pattern, at first only at the holes and only later involving the entire sleeve, which is very similar to that of burning wood. Because of the difficultly flammable sleeve, the log retains its shape for a prolonged time after ignition of the contents.

Expediently, to prevent fuel losses, the artificial logs are sealed into plastic foil such as cellophane foil. For use they are taken out of the foil, ignited at the ignition strip, and placed in the fireplace with the ignition strip up. Depending on the number of holes or width of the slit as well as on the quantity of fuel, the burning time of a "log" may be up to three hours.

The artificial logs of the instant invention may, of course, also be used for display purposes. It is further possible to use them for generation of light, for instance as an emergency or warning light; but for this purpose it is advisable to greatly reduce the number of holes in the sleeve, possibly even to provide only one opening.

The accompanying drawings schematically illustrate two embodiments of the present invention.

FIG. 1 is a perspective view of an artificial fireplace log consisting of a difficultly flammable, slowburning cylindrical sleeve 1 having a plurality of spaced holes 2 therein, and easily flammable fuel material 3 filling the interior of sleeve 1. When the initially liquid or pasty fuel material 3 is forced into the sleeve 1, the excess flows out through holes 2 and before hardening is shaped into a strip 4 which serves as the ignition site for the log.

Figure 2:
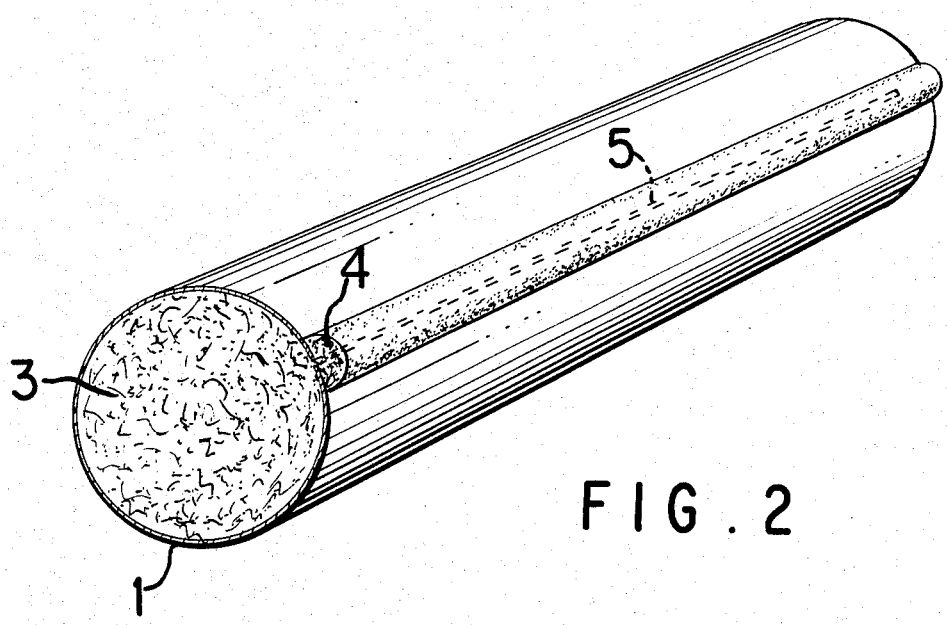

FIG. 2 is a perspective view of an artificial fireplace log as in FIG. 1, except that the holes 2 in sleeve 1 are replaced by slit 5 through which the fuel material 3 flows before hardening to form the ignition strip 4 after hardening.

The following examples further illustrate the present invention and will enable others skilled in the art to understand it more completely. It should be understood, however, that the invention is not limited solely to the particular examples given below.

EXAMPLE 1

Cardboard sleeve, about 50 mm outside diameter, wall thickness 2 mm, length 250 mm, provided with 4 opposite rows of 8 holes each of a diameter of 10 mm. After cladding the sleeve, it was filled with a coal lighter emulsion (petroleum as base, emulsifier, urea-formaldehyde resin, hardener). After standing for about 20 minutes, the filled sleeve (weight about 300 g) was packable or ready for use. The burning time was about 60 to 90 minutes.

EXAMPLE 2

Trihedral body of impact-resistant polystyrene. Length 300 mm, side length of the cross-sectional triangle 60 mm, per side 5 staggered holes of 16 mm filled with a mixture of soft-wood dust (about 40%) and (waste)paraffins (about 60%), which can be pressed into the sleeve or be obtained by pouring the liquefied paraffin mixture onto the previously proportioned wood dust. Burning time about 70 minutes.

EXAMPLE 3

Tubular sleeve of aluminum (laminate) foil in approximately the dimensions listed in Example 1, e.g. with 3 rows of 4 holes each having a diameter of about 12 mm. As filling a mixture of the coal lighter emulsion admixed with hardener and an addition of 30 per cent by weight wood dust was used. Logs of this embodiment burn relatively slowly and leave more embers than when using the coal lighter emulsion alone. Burning time about 70 minutes.

EXAMPLE 4

Irregular, blown hollow body of impact-resistant polystyrene with staggered "nozzle holes", filled with a mixture of about 50 weight percent wood dust, 46 weight percent stearic acid (or stearin-like by-products) and 5 weight percent potassium nitrate as combustion promotor. The mixture must thereafter be pressed into the sleeve. Burning time about 55 minutes.

EXAMPLE 5

(a) Sleeve body

Cylindrical, slit hollow body of bonded paperboard or bonded paper in analogy to the cylinders/sleeves of household crepe paper rolls. Length 25–35 cm, inside diameter about 3–5 cm, wall thickness 1–2 mm. Also the use of corrugated cardboard is possible.

(b) Filling

Usual substance for the production of grill lighters (base: low-soot petroleum, emulsifier, urea-formaldehyde resin, hardener).

(c) Manufacture

The sleeve described under (a) is placed upright in a suitable mold, which permits the filling and simultaneous shaping of the ignition strip (ignition bead). The filled sleeve can be taken out of the mold by flapping open or ejection, after the filling has hardened (20–30 minutes). Thereafter the finished product is sealed into a cellophane foil.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. A firewood substitute product consisting of a difficultly flammable elongated sleeve made of cardboard, kraft paper, difficultly flammable plastic, brittle flammable plastic foil or glassfiber fabric, which surrounds an easily flammable white coal lighter emulsion filling consisting of a mixture of wood wastes with paraffins, waxes, stearic acid or by-products from the production of stearic acid and comprising a hardener, said sleeve comprising a longitudinally extending slit or plurality of apertures covered by an ignition ridge consisting of flammable filling.

2. A firewood substitute product of claim 1, where said sleeve comprises a longitudinally extending slit.

3. A firewood substitute product of claim 1, where said sleeve comprises a longitudinally extending plurality of apertures.

4. The method of making a product of claim 1, which comprises filling a slight excess of liquid or pasty white coal lighter emulsion consisting of wood wastes with paraffins, waxes, stearic acid or by-products from the production of stearic acid and comprising a hardener into a difficultly flammable cardboard, kraft paper, plastic or glassfiber sleeve comprising a plurality of apertures therein, and shaping the excess substance welling out of the apertures into a continuous strip covering the apertures.

5. The method of making a product of claim 1, which comprises slitting a difficultly flammable cardboard, kraft paper, plastic or glassfiber sleeve open in lengthwise direction, filling it with a slight excess of liquid or pasty white coal lighter emulsion consisting of a mixture of wood wastes with paraffins, waxes, stearic acid or by-products from the production of stearic acid and comprising a hardener, and shaping the excess substance oozing out of the slit into a continuous strip covering the slit.

* * * * *